(12) United States Patent
Nakazono et al.

(10) Patent No.: US 7,547,839 B2
(45) Date of Patent: Jun. 16, 2009

(54) PERFORMANCE DATA PROCESSING APPARATUS, PERFORMANCE DATA PROCESSING METHOD, AND COMPUTER READABLE MEDIUM CONTAINING PROGRAM FOR IMPLEMENTING THE METHOD

(75) Inventors: Hiroki Nakazono, Hamamatsu (JP); Shigehiko Mizuno, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 13 days.

(21) Appl. No.: 11/386,170

(22) Filed: Mar. 21, 2006

(65) Prior Publication Data
US 2006/0213356 A1   Sep. 28, 2006

(30) Foreign Application Priority Data
Mar. 22, 2005   (JP)   ............................. 2005-082507
Mar. 22, 2005   (JP)   ............................. 2005-082508

(51) Int. Cl.
*G10H 1/00*   (2006.01)
(52) U.S. Cl. .............................. 84/601; 84/626; 84/633; 84/662
(58) Field of Classification Search ............... 84/601, 84/626, 633, 662, 665
See application file for complete search history.

(56) References Cited

U.S. PATENT DOCUMENTS

2004/0011190 A1   1/2004   Kawashima

FOREIGN PATENT DOCUMENTS

| JP | 61-255575 | 11/1986 |
|---|---|---|
| JP | 08-115084 | 5/1996 |
| JP | 2001-142496 | 5/2001 |
| JP | 2002-100120 | 4/2002 |
| JP | 2004-039142 | 2/2004 |

OTHER PUBLICATIONS

Pro Audio User's Guide (Cakewalk, 1999). See pp. B-3, B-4, H-1, H-2, 2-24, 13-21, 7-38, 7-14, 7-19, 7-36, and 7-37.*
Rinasoft: "Midi2Wav, Screenshots, Helpfile" [Online], Mar. 3, 2005, XP00238549, Internet.
Steinberg Media Technologies AG: "Cubasis Vst, 4.0 Mode d'emploi," Mode D'Emploi, [CD-ROM] 2002, XP002386550.
Anonymous: "Cubase.com FAC Articles 150 and 151" [Online], Feb. 12, 2003, XP002386551, www.cubase.com.
Anonymous: "Cubase VST Masterclass, Part 2: Taking Control," Computermusic.co.uk [Online].
Midi2Wav.com, Midi2Wav Recorder - Version 3.61, [online], Jun. 3, 2004, [Search Date: Nov. 20, 2008], , http://web.archive.org/web/20040603073948/http://www.midi2wav.com/m2winstall.exe (12 pages).
Official Action for Japanese Patent Application No.: 2005-082507, mailed Dec. 2, 2008 (7 pages).
Official Action for Japanese Patent Application No.: 2005-082508, mailed Dec. 2, 2008 (6 pages).
Japanese Office Action, mailed Mar. 31, 2009 for JP 2005-082507.

* cited by examiner

*Primary Examiner*—David S. Warren
(74) *Attorney, Agent, or Firm*—Morrison & Foerster LLP

(57) ABSTRACT

An automatic performance data processing apparatus which makes it possible to simply convert a plurality of automatic performance data into digital audio data in a batch. Each of a plurality of automatic performance data in an order designated by a playlist data stored in a storage device is sequentially reproduced. Audio signals generated by a tone generator that is supplied with tone generator driving events that occur in response to reproduction of each automatic performance data and that generates audio signals based on the supplied tone generator driving events are digitally recorded. The digitally recorded audio signals are stored in a storage medium as digital audio data.

8 Claims, 13 Drawing Sheets

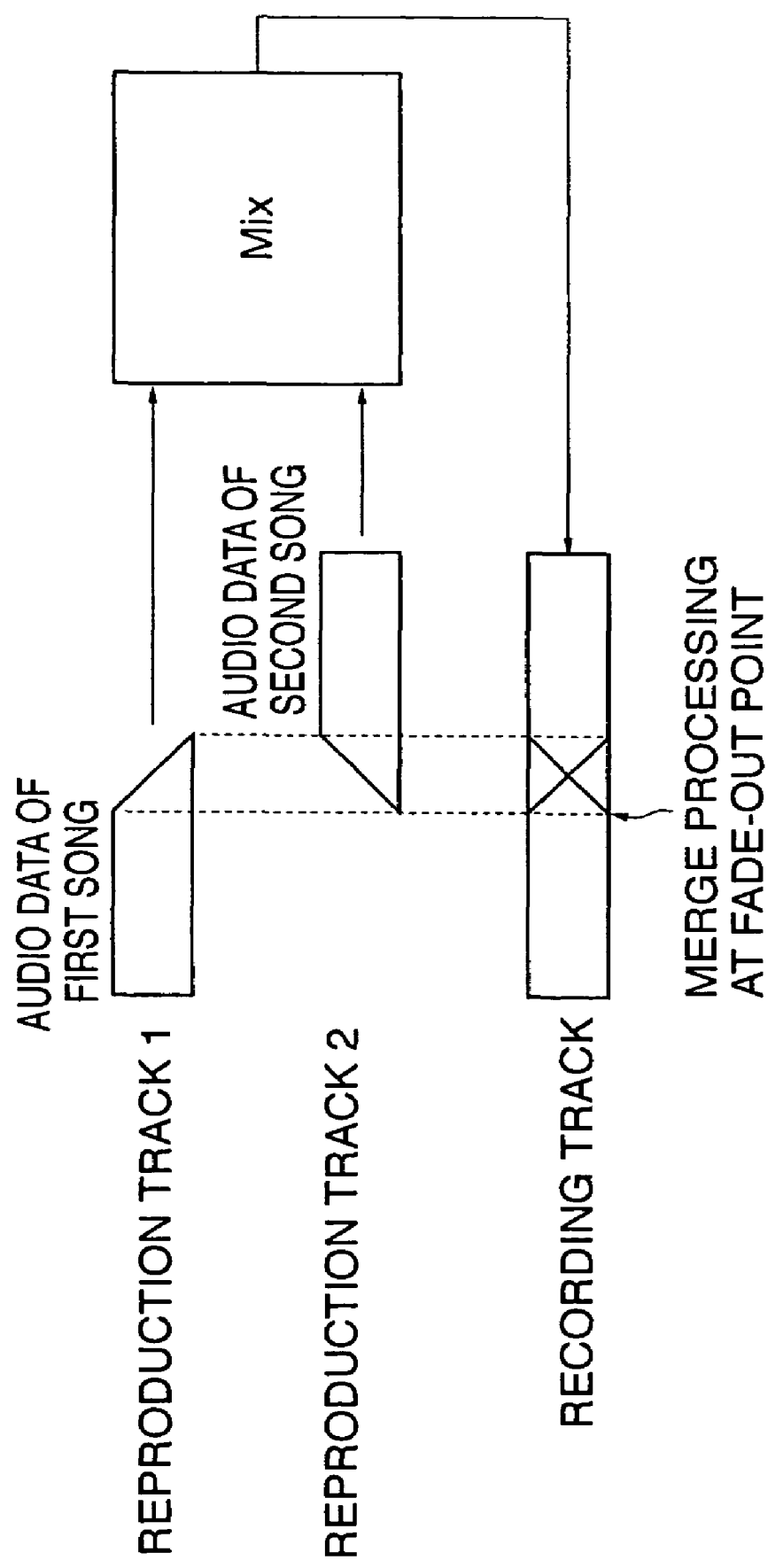

PERFORMANCE DATA PROCESSING APPARATUS, PERFORMANCE DATA PROCESSING METHOD, AND COMPUTER READABLE MEDIUM CONTAINING PROGRAM FOR IMPLEMENTING THE METHOD

BACKGROUND OF THE INVENTION

1. Field of the Invention

The invention relates to an automatic performance data processing apparatus and an automatic performance data processing method that convert automatic performance data into digital audio data, as well as a computer-readable medium containing a program for implementing the method.

2. Description of the Related Art

Conventionally, there has been known an automatic performance data processing apparatus that converts automatic performance data formed in MIDI (Musical Instrument Digital Interface) format and the like into digital audio data (see U.S. Patent Publication No. 2004-0011190 A1, for example).

However, in the above described conventional automatic performance data processing apparatus, the case of converting a plurality of automatic performance data into digital audio data in a batch is not assumed, and thus, when converting a plurality of automatic performance data into digital audio data, it has been necessary to perform the conversion by designating the target automatic performance data one at a time, which is troublesome.

Furthermore, conversion to digital audio data from automatic performance data that smoothly connects the joints of a plurality of performance data has not been proposed heretofore.

SUMMARY OF THE INVENTION

It is a first object of the present invention to provide an automatic performance data processing apparatus and an automatic performance data processing method that make it possible to simply convert a plurality of automatic performance data into digital audio data in a batch, as well as a computer-readable medium containing a program for implementing the method.

It is a second object of the present invention to provide an automatic performance data processing apparatus and an automatic performance data processing method that make it possible to simply convert a plurality of automatic performance data into digital audio data in a batch while smoothly connecting the joints of the plurality of performance data, as well as a computer-readable medium containing a program for implementing the method.

To attain the above described first object, in a first aspect of the present invention, there is provided an automatic performance data processing apparatus comprising a storage device that stores a playlist data that designates a reproduction order of a plurality of automatic performance data that respectively comprise a tone generator driving event sequence, a reproduction device that sequentially reproduces each of the plurality of automatic performance data in an order designated by the playlist data stored in the storage device, a tone generator that is supplied with tone generator driving events that occur in response to reproduction of each automatic performance data by the reproduction device, and that generates audio signals based on the supplied tone generator driving events, a recording device that digitally records audio signals generated by the tone generator, and a retention device that retains audio signals digitally recorded by the recording device as digital audio data.

With the configuration of the automatic performance data processing apparatus in the first aspect of the present invention, based on a playlist data that has been previously prepared for reproducing a plurality of automatic performance data, it is possible to simply generate digital audio data corresponding to the plurality of automatic performance data in a batch.

Preferably, the automatic performance data processing apparatus further comprises a control device that controls so as to generate a plurality of digital audio data that correspond respectively to the plurality of automatic performance data by starting and stopping digital recording by the recording device in response to starting and stopping of reproduction of each of the automatic performance data by the reproduction device, and to retain the generated plurality of digital audio data through the retention device.

With the preferable configuration of the automatic performance data processing apparatus in the first aspect of the present invention, it is possible to simply generate individual digital audio data that correspond respectively to each of a plurality of automatic performance data.

Preferably, the automatic performance data processing apparatus further comprises a control device that controls so as to generate a single digital audio data from the plurality of automatic performance data by starting digital recording by the recording device in response to starting of reproduction of a first automatic performance data by the reproduction device and stopping digital recording by the recording device in response to stopping of reproduction of a last automatic performance data by the reproduction device, and to retain the generated single digital audio data through the retention device.

With the preferable configuration of the automatic performance data processing apparatus in the first aspect of the present invention, it is possible to simply generate a single digital audio data that corresponds to data that includes a plurality of automatic performance data.

Preferably, the automatic performance data processing apparatus further comprises a first control device that controls so as to generate a plurality of digital audio data that correspond respectively to the plurality of automatic performance data by starting and stopping digital recording by the recording device in response to starting and stopping of reproduction of each of the automatic performance data by the reproduction device, and to retain the generated plurality of digital audio data through the retention device; a second control device that controls so as to generate a single digital audio data from the plurality of automatic performance data by starting digital recording by the recording device in response to starting of reproduction of a first automatic performance data by the reproduction device and stopping digital recording by the recording device in response to stopping of reproduction of a last automatic performance data by the reproduction device, and to retain the generated single digital audio data through the retention device; and a selection setting device that selects and sets one of control processing by the first control device and control processing by the second control device.

With the preferable configuration of the automatic performance data processing apparatus in the first aspect of the present invention, it is possible to simply generate the digital audio data a user selects from among individual digital audio data that correspond respectively to each of a plurality of automatic performance data and a single digital audio data that corresponds to data that includes a plurality of automatic performance data.

To attain the above described second object, in the second aspect of the present invention, there is provided an automatic performance data processing apparatus comprising a reproduction device that sequentially reproduces a plurality of automatic performance data that respectively comprise a tone generator driving event sequence, a tone generator that is supplied with tone generator driving events that occur in response to reproduction of each automatic performance data by the reproduction device, and that generates audio signals based on the supplied tone generator driving events, a recording device that digitally records audio signals generated by the tone generator, a retention device that retains audio signals digitally recorded by the recording device as a single digital audio data, and a cross-fade processing device that performs cross-fade processing for a joint between two audio data that correspond to two neighboring automatic performance data among the plurality of automatic performance data.

With the configuration of the automatic performance data processing apparatus in the second aspect of the present invention, it is possible to smooth a joint between two audio data that correspond to two contiguous automatic performance data.

Preferably, the cross-fade processing device reproduces a first automatic performance data that is earlier in a reproduction order among the two neighboring automatic performance data while fading-out the first automatic performance data from a predetermined fade-out start position, and after digitally recording audio signals generated by the tone generator in response thereto to generate a first digital recording data, adopts the fade-out start position of the first digital recording data as a record starting position and reproduces a second automatic performance data that is later in the reproduction order among the two neighboring automatic performance data while fading-in the second automatic performance data to merge audio signals generated by the tone generator in response thereto with the first digital recording data, and performs digital recording thereof.

With the preferable configuration of the automatic performance data processing apparatus in the second aspect of the present invention, it is possible to overlap a part of two audio data corresponding to two contiguous automatic performance data, without increasing the sound producing channels of a tone generator or number of tracks of automatic performance data.

Preferably, the cross-fade processing device reproduces a first automatic performance data that is earlier in a reproduction order among the two neighboring automatic performance data while fading-out the first automatic performance data from a predetermined fade-out start position, digitally records audio signals generated by the tone generator in response thereto to generate a first digital recording data, and also reproduces a second automatic performance data that is later in the reproduction order among the two neighboring automatic performance data while fading-in the second automatic performance data until a predetermined fade-in end position, and after digitally recording audio signals generated by the tone generator in response thereto to generate a second digital recording data, merges a data portion from the fade-out start position to the fade-in end position among the first digital recording data and a data portion from the fade-out start position to the fade-in end position among the second digital recording data in a connected state.

To attain the above described first object, in a third aspect of the present invention, there is provided an automatic performance data processing method comprising a reproduction step of reproducing in sequence each of a plurality of automatic performance data in an order designated by a playlist data stored in a storage device that stores a playlist data that designates a reproduction order of the plurality of automatic performance data that respectively comprise a tone generator driving event sequence, a recording step of digitally recording audio signals generated by a tone generator that is supplied with tone generator driving events that occur in response to reproduction of each automatic performance data by the reproduction step and that generates audio signals based on the supplied tone generator driving events, and a storage step of storing audio signals digitally recorded by the recording step in a storage medium as digital audio data.

According to the third aspect of the present invention, the same effects as those obtained by the automatic performance data processing apparatus according to the first aspect of the present invention can be obtained.

To attain the above described second object, in a fourth aspect of the present invention, there is provided an automatic performance data processing method comprising a reproduction step of reproducing in sequence a plurality of automatic performance data that respectively comprise a tone generator driving event sequence, a recording step of digitally recording audio signals generated by a tone generator that is supplied with tone generator driving events that occur in response to reproduction of each automatic performance data by the reproduction step and that generates audio signals based on the supplied tone generator driving events, a storage step of storing audio signals digitally recorded by the recording step in a storage medium as a single digital audio data, and a cross-fade processing step of performing a cross-fade process for a joint between two audio data that correspond to two neighboring automatic performance data among the plurality of automatic performance data.

According to the fourth aspect of the present invention, the same effects as those obtained by the automatic performance data processing apparatus according to the second aspect of the present invention can be obtained.

To attain the above described first object, in a fifth aspect of the present invention, there is provided a computer-readable medium containing a program for causing a computer to execute the automatic performance data processing method according to the third aspect of the present invention.

According to the fifth aspect of the present invention, the same effects as those obtained by the automatic performance data processing apparatus according to the first aspect of the present invention can be obtained.

To attain the above described second object, in a sixth aspect of the present invention, there is provided a computer-readable medium containing a program for causing a computer to execute the automatic performance data processing method according to the fourth aspect of the present invention.

According to the sixth aspect of the present invention, the same effects as those obtained by the automatic performance data processing apparatus according to the second aspect of the present invention can be obtained.

The above and other objects, features, and advantages of the invention will become more apparent from the following detailed description taken in conjunction with the accompanying drawings.

BRIEF DESCRIPTION OF THE DRAWINGS

FIG. 11 is a diagram visually showing a MIDI to Audio mode 2 process-3; and

DETAILED DESCRIPTION OF THE PREFERRED EMBODIMENTS

The present invention will now be described in detail with reference to the drawings showing a preferred embodiment thereof.

Figure 1:
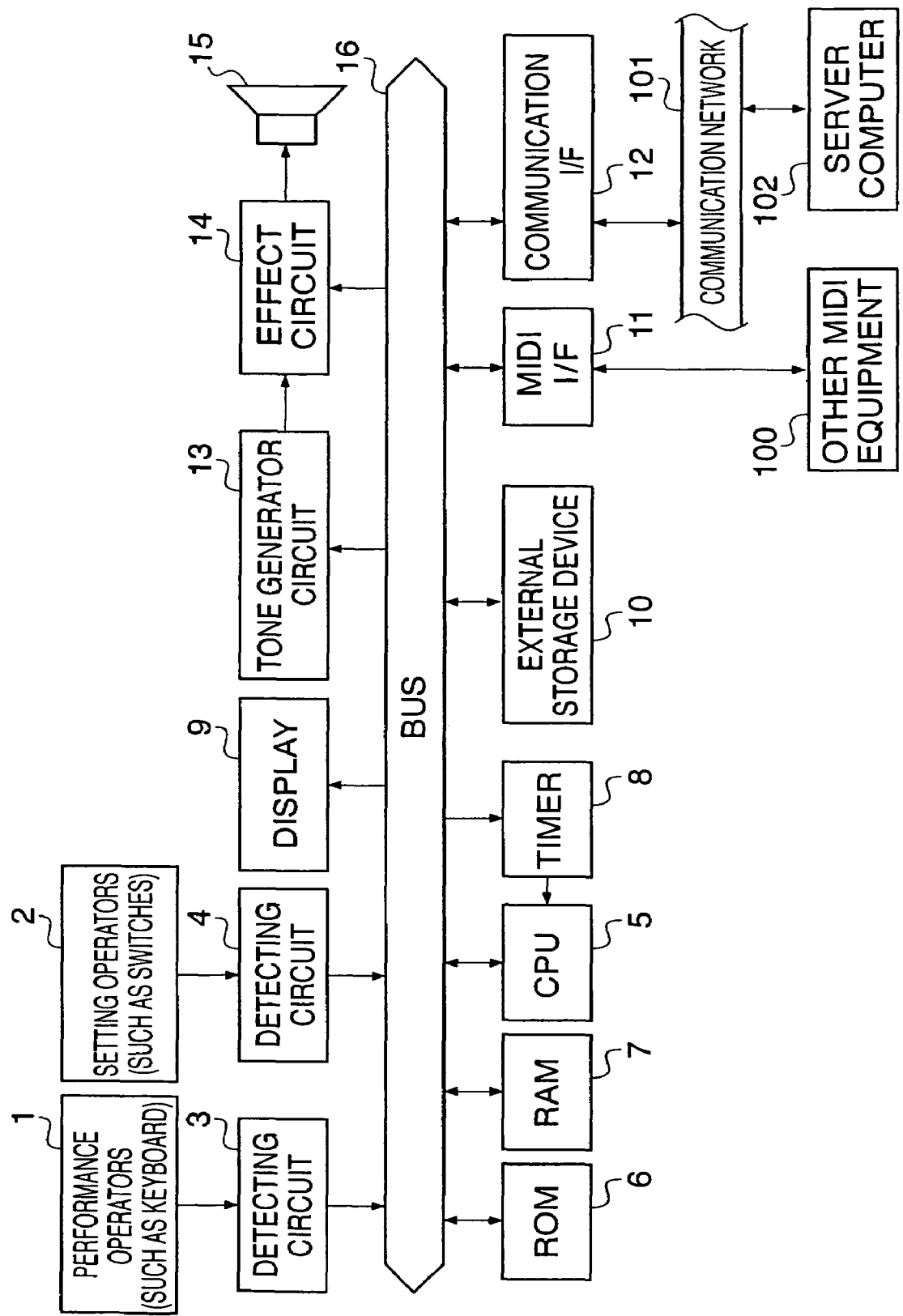
FIG. 1 is a block diagram schematically showing the construction of an automatic performance data processing apparatus according to an embodiment of the present invention.

FIG. 1 is a block diagram schematically showing the construction of an automatic performance data processing apparatus according to an embodiment of the present invention.

As shown in FIG. 1, the automatic performance data processing apparatus according to the present embodiment is comprised of performance operators 1 including a musical keyboard for inputting pitch information, setting operators 2 including a plurality of switches, a numerical keyboard, and a mouse for inputting various kinds of information, a detecting circuit 3 for detecting operative states of the performance operators 1, a detecting circuit 4 for detecting operative states of the setting operators 2, a CPU 5 that controls the entire apparatus, a ROM 6 that stores control programs to be executed by the CPU 5, various table data and so forth, a RAM 7 that temporarily stores MIDI song data, playlist data, various input information, computation results and so forth, a timer 8 that measures an interrupt time for timer interrupt processing and various kinds of time, a display 9 comprised of, e.g., a liquid crystal display (LCD) and light emitting diodes (LEDs) and so forth, for displaying various kinds of information, an external storage device 10 that stores various application programs including the control programs, various MIDI song data, and various other data, a MIDI interface (I/F) 11 that provides interface for inputting MIDI messages from external devices and outputting MIDI messages to external devices, a communication interface (I/F) 12 that provides interface for sending and receiving data to and from, e.g., a server computer (hereinafter simply referred to as "the server") 102 via a communication network 101, a tone generator circuit 13 that converts performance data input by the performance operators 1, preset MIDI song data and other data into audio signals, an effect circuit 14 that applies various effects to audio signals from the tone generator circuit 13, and a sound system 15 comprised of a DAC (Digital-to-Analog Converter), an amplifier, a speaker and so forth, for converting audio signals from the effect circuit 14 into sounds.

The above component elements 3 to 14 are connected to each other via a bus 16. The timer 8 is connected to the CPU 5, other MIDI equipment 100 to the MIDI I/F 11, the communication network 101 to the communication I/F 12, the effect circuit 14 to the tone generator circuit 13, and the sound system 15 to the effect circuit 14. The communication I/F 12 and the communication network 101 need not necessarily be wired, and may be wireless, or one may be wired and the other may be wireless.

The external storage device 10 may be implemented, for example, by a flexible disk drive (FDD), a hard disk drive (HDD), a CD-ROM drive, or a magneto-optical disk (MO) drive. The external storage device 10 may store the control programs to be executed by the CPU 5 as mentioned above; if one or more control programs are not stored in the ROM 6, the control program(s) is (are) stored in the external storage device 10 and loaded into the RAM 7 so that the CPU 5 can operate in the same manner as in the case where the control program(s) is (are) stored in the ROM 6. This facilitates the addition of control programs, the version upgrade, and so forth.

The tone generator circuit 13 may adopt any system, such as a waveform memory system, an FM (frequency modulation) system, a physical model system, a harmonics synthesis system, a formant synthesis system, an analog synthesizer system having a voltage controlled oscillator (VCO) plus a voltage controlled filter (VCF) plus a voltage controlled amplifier (VCA), an analog simulation system and the like. The tone generator circuit 13 is not limited only to those configured using dedicated hardware, but may be configured by a digital signal processor (DSP) and a micro program, by a CPU and a software program, or by a combination of these. One tone generator circuit may be used time divisionally to form a plurality of sound producing channels, or one tone generator circuit may be used to form one sound producing channel.

As will be understood from the above described construction, the automatic performance data processing apparatus according to the present embodiment is constructed on an electronic musical instrument.

In the case where the automatic performance data processing apparatus is implemented by an electronic musical instrument, the electronic musical instrument should not necessarily be a keyboard musical instrument, but may be a stringed instrument type, a wind instrument type, a percussion instrument type or the like. Further, a tone generator apparatus, an automatic performance data processing apparatus, and so forth should not necessarily be incorporated into an electronic musical apparatus, but may be configured as separate bodies and connected to each other via communication means such as a MIDI I/F and various kinds of networks.

Further, the automatic performance data processing apparatus according to the present embodiment may be constructed on a dedicated apparatus, other than an electronic musical instrument, comprised of minimum elements which can realize the present invention. Examples of the dedicated apparatus include a karaoke machine, a game machine, and a portable communication terminal such as a cellular phone. In the case where the present invention is applied to a portable communication terminal, it should not necessarily be configured such that predetermined functions are completed by only the terminal, but part of the functions may be assigned to a server so that a system comprised of the terminal and the server can realize the predetermined functions. Alternatively, the automatic performance data processing apparatus according to the present embodiment may be constructed on a general-purpose personal computer.

Figure 2:
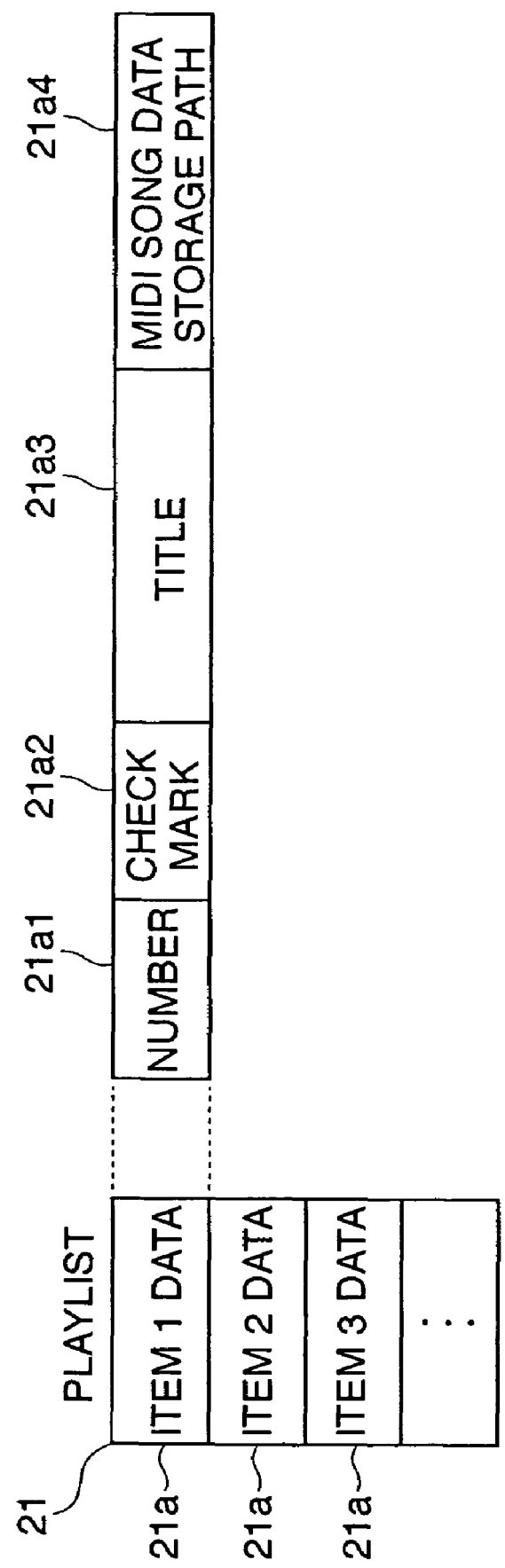
FIG. 2 is a view showing an example of the data format of a playlist data.

FIG. 2 is a view showing an example of the data format of the playlist data. The term "playlist data" refers to data which, in order to reproduce a plurality of MIDI song data in succession, lists the reproduction order and so on of each MIDI song data. This playlist data can be created or edited by a user or the like.

As shown in FIG. 2, a playlist data 21 is comprised of a plurality of item n data (n=1, 2 . . . ) 21a.

Each item n data 21a has the same data format, comprising of a number data 21a1, a checkmark data 21a2, a title data 21a3, and a MIDI song data storage path data 21a4. The number data 21a1 represents the number at which to reproduce the MIDI song data in question among the plurality of MIDI song data for which reproduction is indicated by the playlist data 21. The checkmark data 21a2 represents whether or not to make the MIDI song data in question an object of a MIDI to Audio process. More specifically, when a checkmark is assigned in the checkmark data 21a2, the MIDI song data in question is taken as an object of a MIDI to Audio process, and when a checkmark is not assigned therein the MIDI song data in question is not taken as an object of a MIDI to Audio process. The title data 21a3 represents the title of the MIDI song data in question. The MIDI song data storage path data 21a4 shows the storage location of the MIDI song data in question in the external storage device 10 by means of a path.

In the present embodiment, the playlist data is stored in the RAM 7, and thus, in this case, the playlist data will be erased when the power supply to the RAM 7 stops. Therefore, when a user wants to continue storing the playlist data, the playlist data may be stored in the external storage device 10 or a newly provided RAM with a backup power supply.

According to the present embodiment, the number of MIDI song data pre-stored in the apparatus is generally large due to data capacity, and hence the MIDI song data is stored in the external storage device 10. Accordingly, as described above, the MIDI song data storage path data 21a4 shows the storage location in the external storage device 10. However, when all of the reproduced MIDI song data are read out from the external storage device 10 to the RAM 7, where they are automatically stored once MIDI song data is reproduced in accordance with the playlist data 21, the MIDI song data storage path data 21a4 may show the storage location of the MIDI song data in the RAM 7. However, when reproducing MIDI song data in accordance with the playlist data 21 in the automatic performance data processing apparatus according to the present embodiment, at the time of initial reproduction or during reproduction the MIDI song data for one song is read out and automatically stored in a reproduction area (not shown) in the RAM 7 while posterior to reproduction of that MIDI song data and shifting to the next MIDI song data, that subsequent MIDI song data is read out and stored in the above described reproduction area. Thus, since ultimately MIDI song data for only one song can be held in the reproduction area, the MIDI song data storage path data 21a4 always shows a storage location in the external storage device 10.

The data format of MIDI song data may be in any format such as: a "event plus relative time" sequence where the time of occurrence of each performance event is represented by a time length from the immediately preceding performance event; an "event plus absolute time" sequence where the time of occurrence of each performance event is represented by an absolute time within the music piece or a measure thereof; a "pitch (or rest) plus note length" sequence where each performance event is represented by a pitch and length of a note or a rest and a length of the rest; or a "solid" format where a memory region is reserved for each minimum resolution of a performance within the RAM 7 and each performance event is stored in one of the memory regions that corresponds to the time of occurrence of the performance event.

The above described data format of the playlist data represents merely an example thereof, and other formats may also be used.

An outline of a MIDI to Audio process carried out by the automatic performance data processing apparatus configured as described above will first be described referring to FIG. 3 and FIG. 4, and the process will then be described in detail referring to FIG. 5 to FIG. 7.

Figure 3:
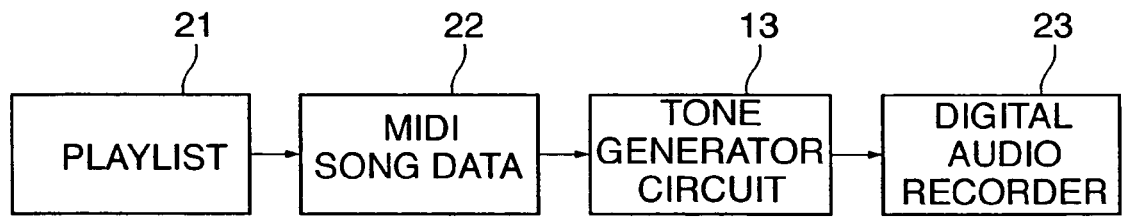
FIG. 3 is a block diagram that illustrates the concept of a MIDI to Audio process.

FIG. 3 is a block diagram that illustrates the concept of a MIDI to Audio process.

As shown in FIG. 3, when a user prepares the playlist data 21 and instructs the start of digital recording (batch MIDI to Audio), the automatic performance data processing apparatus according to the present embodiment first of all reads out from the external storage device 10 the MIDI song data that is listed at the start of the playlist data 21 from among the plurality of MIDI song data for which reproduction is designated by the playlist data 21, and stores that MIDI song data in the reproduction area of the RAM 7.

Next, the automatic performance data processing apparatus according to the present embodiment reproduces the MIDI song data stored in the reproduction area, in a sequence starting from the top thereof. More specifically, the automatic performance data processing apparatus reads out each performance event included in the MIDI song data at the occurrence timing thereof, writes parameters corresponding to the thus read-out performance event in a predetermined register of the tone generator circuit 13, and instructs the generation of audio signals by the tone generator circuit 13. In response thereto, the corresponding audio signals are generated from the tone generator circuit 13, and digital recording of these audio signals is then performed by a digital audio recorder 23. In this case, the digital audio data that is generated by the digital recording may be any type of data such as, for example, uncompressed WAV data or compressed audio data such as MP3 (MPEG audio layer 3), and the data may be in a general purpose format or a format that is unique to each manufacturer.

Figure 4:
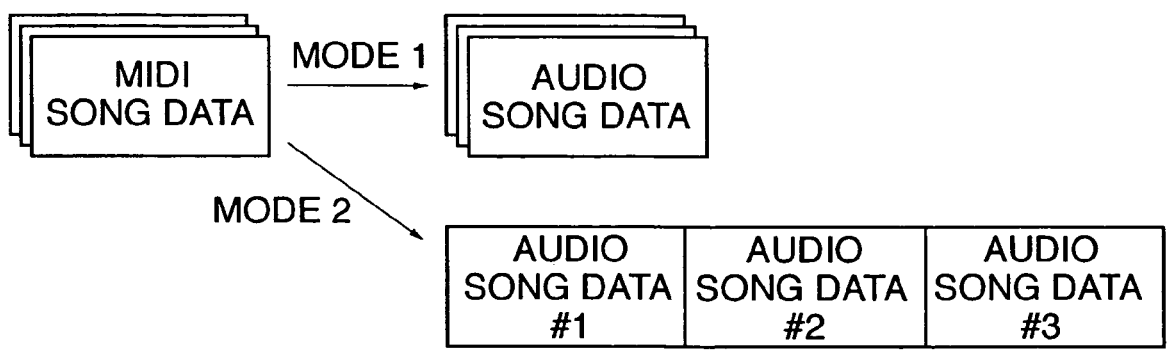
FIG. 4 is a view for explaining two kinds of MIDI to Audio processes that correspond to two types of MIDI to Audio modes.

The automatic performance data processing apparatus then reads out the next MIDI song data to be reproduced from the external storage device 10 and writes it in the reproduction area, and similarly reproduces this data to perform digital recording. In performance data processing apparatus according to the present embodiment, two kinds of modes, mode 1 and mode 2, are provided as the modes (MIDI to Audio modes) when performing digital recording, and different digital recording (MIDI to Audio processing) is performed according to the mode selected by the user. FIG. 4 is a view for explaining the two kinds of MIDI to Audio processes that correspond to these two kinds of MIDI to Audio modes. As shown in FIG. 4, mode 1 digitally records each of a plurality of MIDI song data as respectively corresponding digital audio song data. In mode 1, the number of digital audio song data files that are generated matches the number of MIDI song data. Mode 2 digitally records a plurality of MIDI song data collectively in reproduction order as a single digital audio song data. In mode 2, one digital audio song data file is generated, irrespective of the number of MIDI song data.

The configuration of the digital audio recorder 23 or the digital recording method thereof is not a feature of the present invention, and a known device is thus used as the digital audio recorder 23. Accordingly, further description of the digital audio recorder 23 is omitted herein.

Thus, according to the MIDI to Audio process it is possible to simply generate digital audio song data that corresponds to a plurality of automatic performance data on the basis of previously prepared playlist data for reproduction of the plurality of automatic performance data. Further, it is possible in mode 1 to simply generate individual digital audio song data files that correspond respectively to a plurality of automatic performance data, and in mode 2 it is possible to simply generate a single digital audio song data file that corresponds to data which includes a plurality of automatic performance data. Since the user can select either mode 1 or mode 2, it is possible to simply generate the digital audio data of the user's preference.

Next, this MIDI to Audio process will be described in detail.

Figure 5:
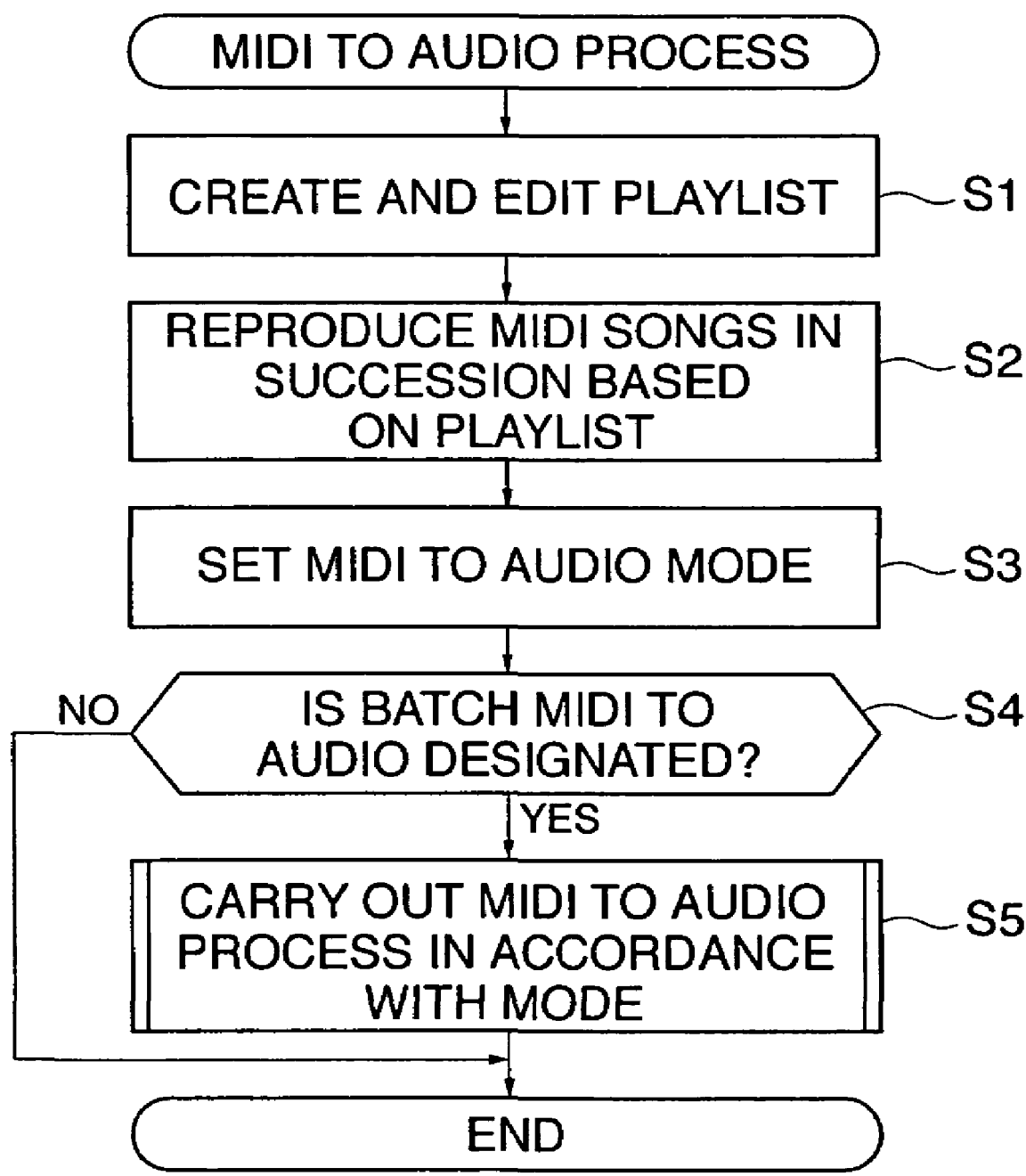
FIG. 5 is a flowchart showing the procedure of a MIDI to Audio process carried out by the automatic performance data processing apparatus in FIG. 1, particularly the CPU.

FIG. 5 is a flowchart showing the procedure of a MIDI to Audio process carried out by the automatic performance data processing apparatus according to the present embodiment, particularly the CPU.

As shown in FIG. 5, first the user prepares playlist data (step S1). Thereafter, when the user, for example, presses a play switch (not shown) provided in the setting operators 2, the MIDI song data is reproduced in succession in the order in which it is listed in the playlist data (step S2)

Next, when the user, for example, presses either of two mode switches (not shown) provided among the setting operators 2 in correspondence, respectively, to the two kinds of MIDI to Audio modes to designate the MIDI to Audio mode (step S3), and then presses a batch MIDI to Audio switch (not shown) provided among the setting operators 2 (step S4), a MIDI to Audio process is carried out in accordance with the designated MIDI to Audio mode (step S5).

Figure 6:
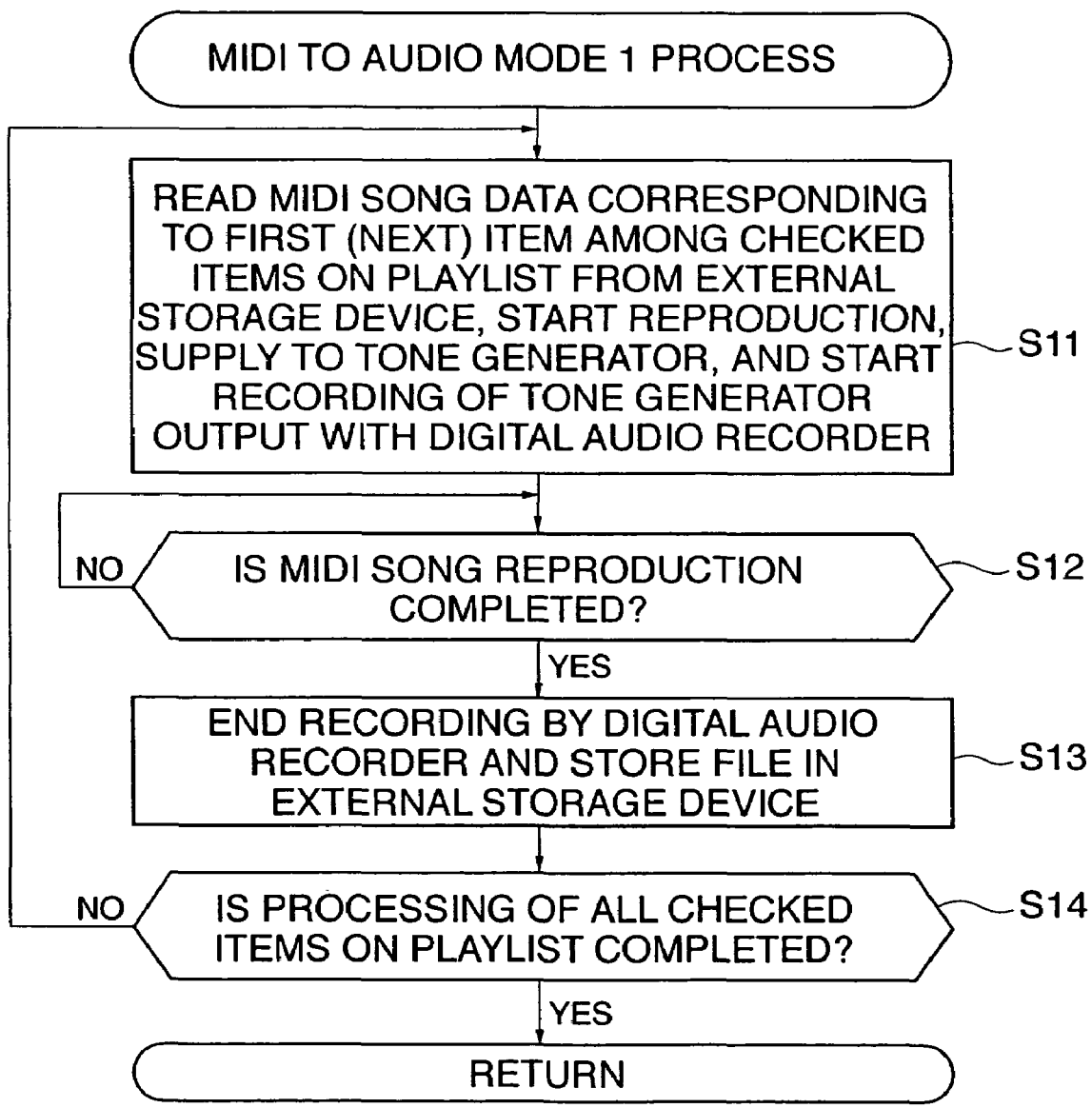
FIG. 6 is a flowchart showing the procedure of a MIDI to Audio mode 1 process carried out when mode 1 is designated as a MIDI to Audio mode.

FIG. 6 is a flowchart showing the procedure of the MIDI to Audio mode 1 process carried out when mode 1 is designated as the MIDI to Audio mode.

As shown in FIG. 6, in the MIDI to Audio mode 1 process, among a plurality of item n data 21a included in the prepared playlist data, the MIDI song data in a location indicated by the MIDI song data storage path data 21a4 of the first item n data 21a having a checkmark assigned in the checkmark data 21a2 is read out from the external storage device 10 and written in the reproduction area of the RAM 7 to start reproduction, the first performance event included in that MIDI song data is read out at the time of occurrence thereof, parameters in accordance with the thus read-out performance event are supplied to the tone generator circuit 13, and digital recording of audio signals that are output from the tone generator circuit 13 in response thereto starts at the digital audio recorder 23 (step S11).

Thereafter, supply of performance events to the tone generator circuit 13 and digital recording of audio signals output from the tone generator circuit 13 in response thereto is repeated until the final performance event included in that MIDI song data (step S12). When digital recording of the final performance event ends, that digital recording is temporarily terminated, and the digital audio data digitally recorded in correspondence with the first MIDI song data is stored in file format in the external storage device 10 (step S13). As used herein, the term "stored in file format" refers to, for example, adding header data that describes bibliographic matters such as the date and time of recording and the file name, and end data indicating the end of the file, to the digital audio data digitally recorded for storage. The date and time of recording is normally described automatically by a clock function that is contained within the automatic performance data processing apparatus according to the present embodiment, and the file name may be automatically generated and described or a file name designated by the user may be described. As an example of an automatically generated file name, a file name in which the file name of the basic MIDI song data (name indicated by the title data 21a3) or the like is used, or a predetermined character string is added to sequential number (AUDIO_001, AUDIO_002, AUDIO_003 . . . ) may be mentioned.

The above described digital recording and storage in file format is carried out for MIDI song data corresponding to all the item n data 21a having a checkmark assigned in the checkmark data 21a2 among the plurality of item n data 21a included in the playlist data (steps S14→S11→S12→S13→S14→return).

Thus, according to the present MIDI to Audio mode 1 processing, a single digital audio song data file is generated and stored for each MIDI song data that respectively corresponds to each item n data 21a having a checkmark assigned in the checkmark data 21a2 among the plurality of item n data 21a included in the playlist data.

Figure 7:
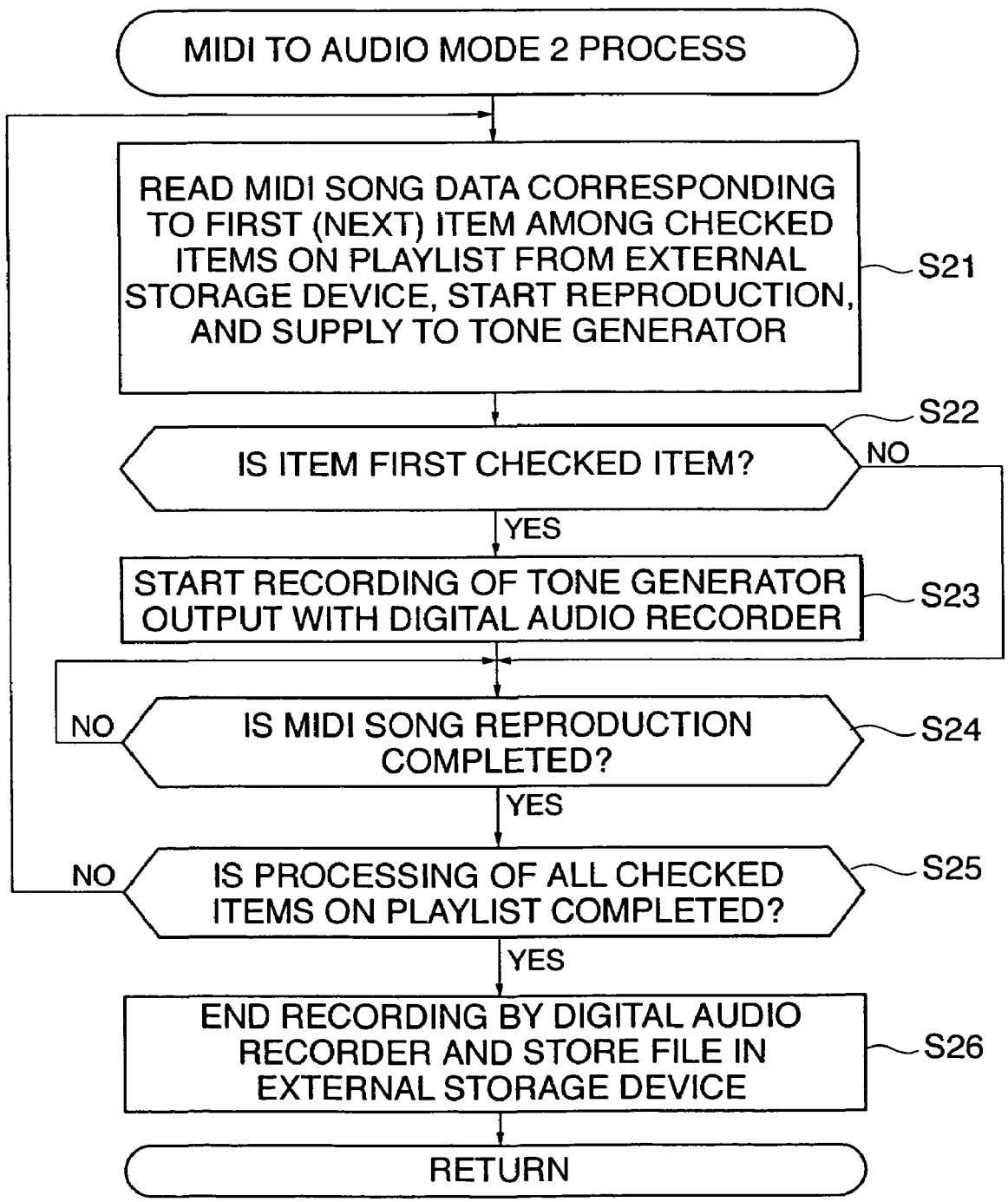
FIG. 7 is a flowchart showing the procedure of a MIDI to Audio mode 2 process carried out when mode 2 is designated as the MIDI to Audio mode.

FIG. 7 is a flowchart showing the procedure of a MIDI to Audio mode 2 process carried out when mode 2 is designated as the MIDI to Audio mode.

A difference between this MIDI to Audio mode 2 process and the MIDI to Audio mode 1 process is that MIDI song data corresponding to all the item n data 21a that have a checkmark assigned in the checkmark data 21a2 among the plurality of item n data 21a included in the playlist data is reproduced in order from the lowest of the number data 21a1 and digital recorded to create a single digital audio song data file.

Thus, according to this MIDI to Audio mode 2 process, among a plurality of item n data 21a included in prepared playlist data, the MIDI song data in a location indicated by the MIDI song data storage path data 21a4 of the first item n data 21a that has a checkmark assigned in the checkmark data 21a2 is read out from the external storage device 10 and written in the reproduction area of the RAM 7 to start reproduction, the first performance event included in that MIDI song data is then read out at the time of occurrence thereof, and when parameters in accordance with the thus read-out performance event are supplied to the tone generator circuit 13, digital recording starts (step S23). When digital recording of the MIDI song data corresponding to the final item n data 21a that is assigned with a checkmark ends, digital recording is terminated and the digital audio data from the digital audio data digitally recorded in correspondence to the first MIDI song data until the digital audio data digitally recorded in correspondence to the final MIDI song data are stored together in a single file format in the external storage device 10 (step S26).

Therefore, according to this MIDI to Audio mode 2 process, a single digital audio file is generated and stored for the MIDI song data corresponding to all of the item n data 21*a* having a checkmark assigned in the checkmark data 21*a*2 among the plurality of item n data 21*a* included in the playlist data.

Next, a MIDI to Audio mode 2 process-2 will be described as a modification example of the MIDI to Audio mode 2 process.

A difference between the MIDI to Audio mode 2 process-2 and the above MIDI to Audio mode 2 process is that the MIDI to Audio mode 2 process-2 connects together neighboring audio song data by cross-fading.

Figure 8:
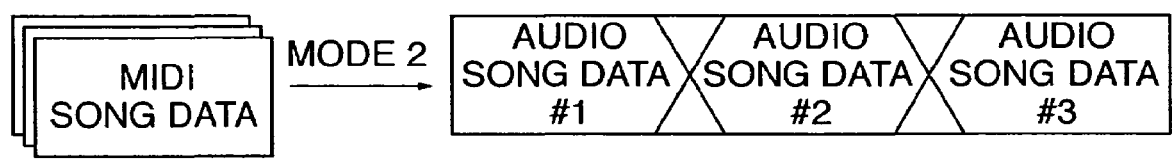
FIG. 8 is a view showing an example of a processing result obtained by a MIDI to Audio mode 2 process-2.

FIG. 8 is a view showing an example of a processing result obtained by the MIDI to Audio mode 2 process-2. As shown in FIG. 8, when a plurality of MIDI song data are reproduced one at a time and digitally recorded to generate corresponding audio song data, neighboring audio song data are connected by cross-fading.

Hereunder, the MIDI to Audio mode 2 process-2 carried out by the automatic performance data processing apparatus according to the present embodiment will be described in detail referring to FIG. 9 and FIGS. 10A and 10B.

Figure 9:
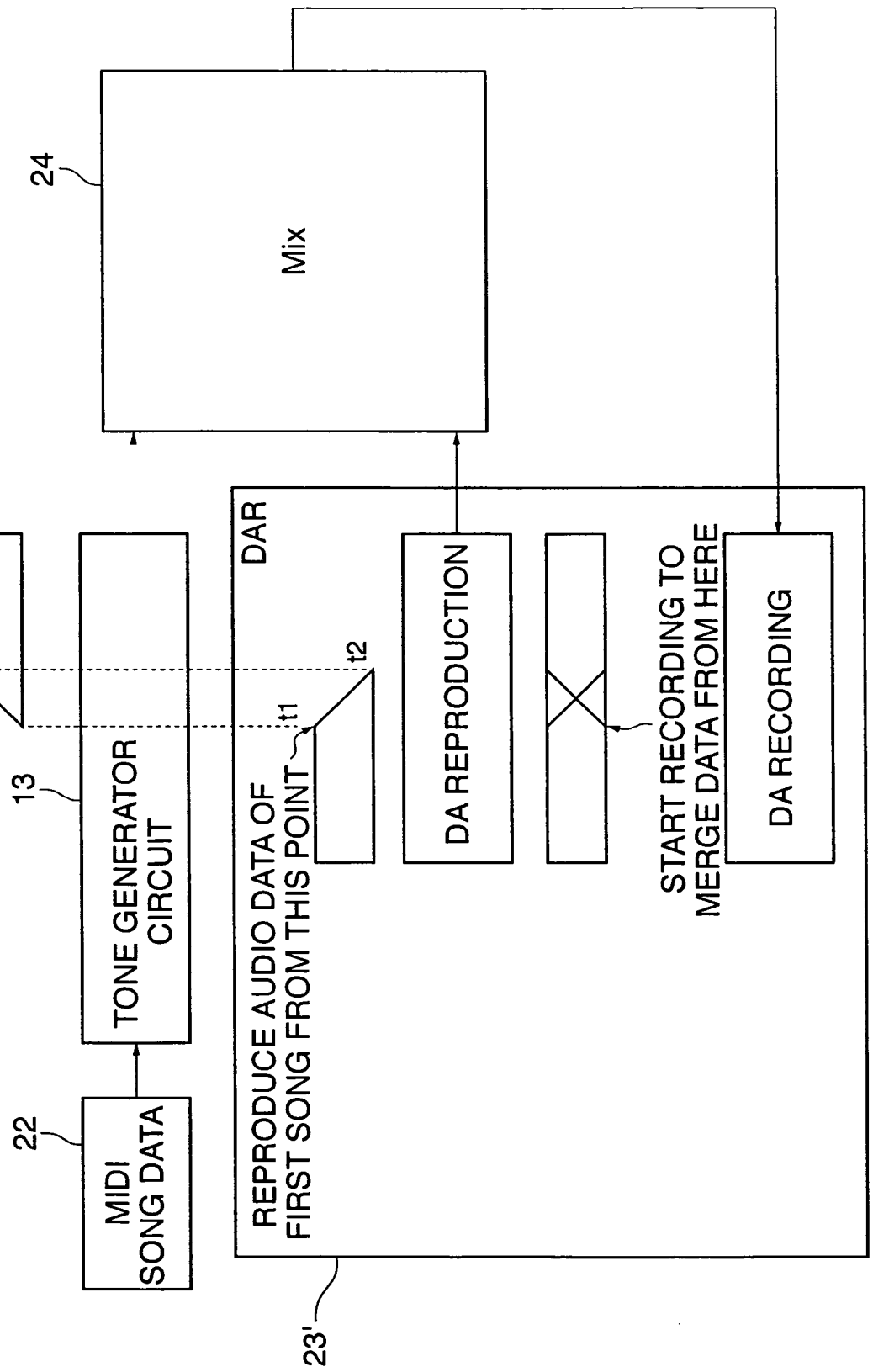
FIG. 9 is a diagram visually showing a MIDI to Audio mode 2 process-2.
Figure 10A:
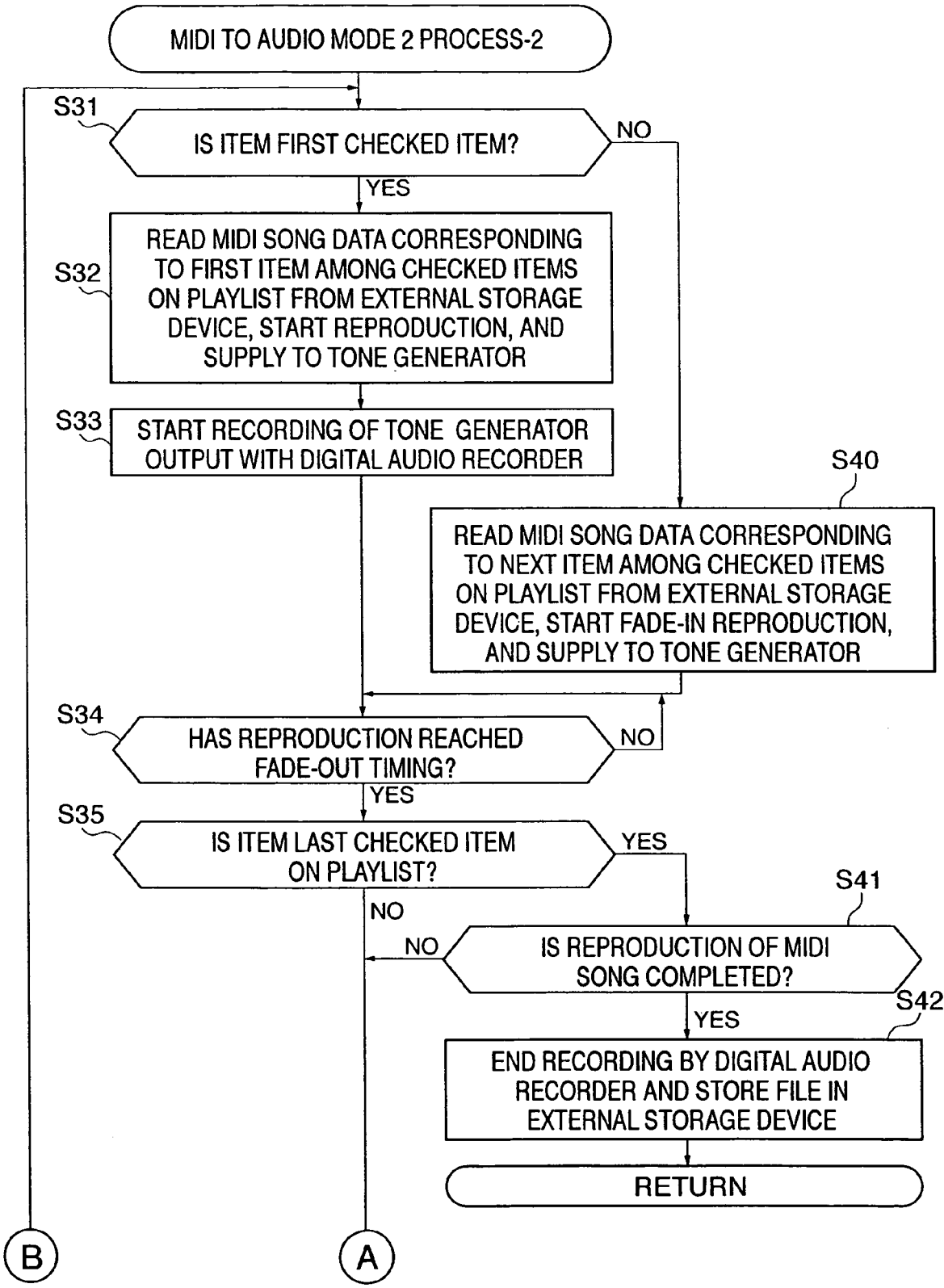
FIG. 10A is a flowchart showing the procedure of the MIDI to Audio mode 2 process-2.
Figure 10B:
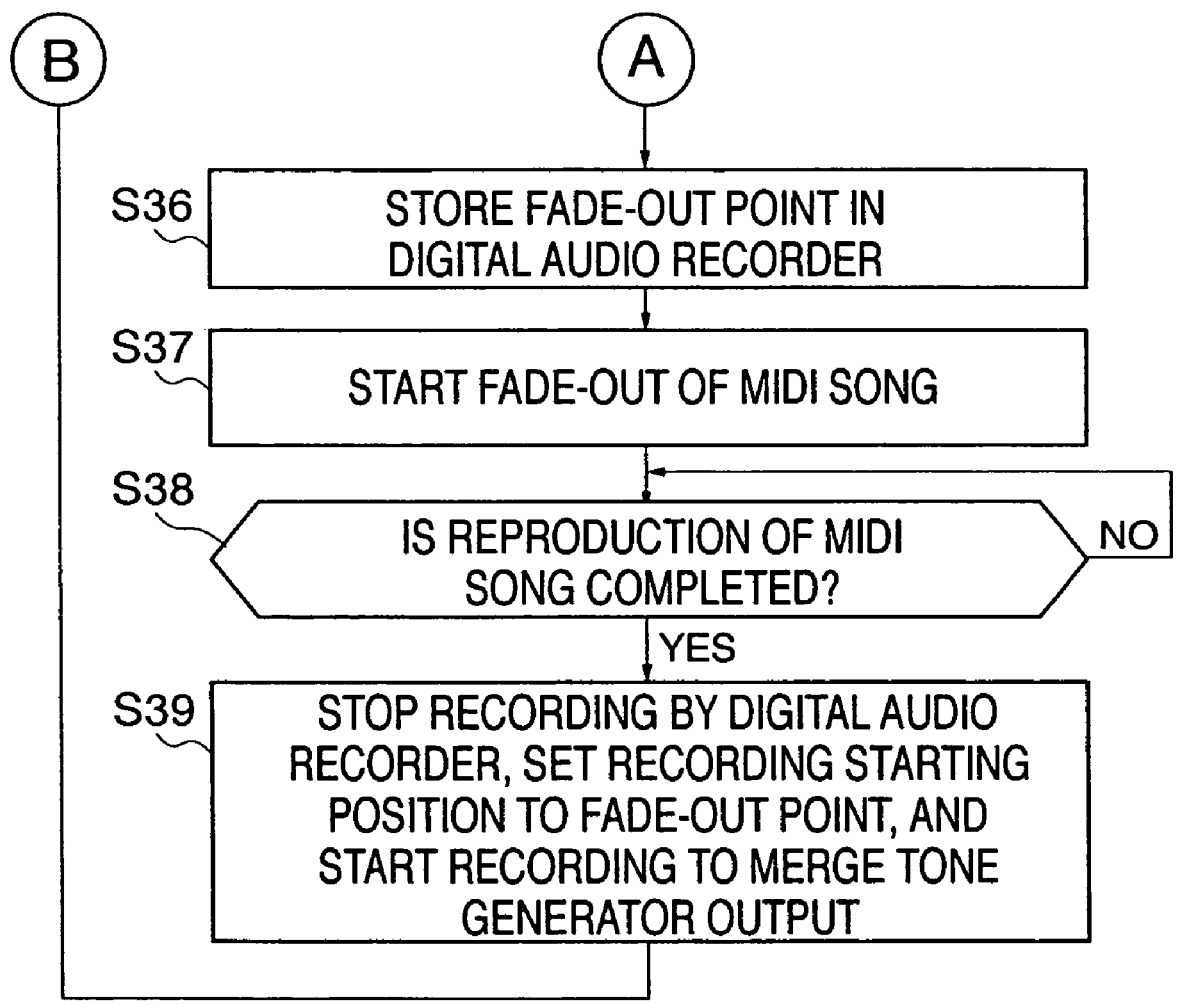
FIG. 10B is a flowchart showing a continued part of the procedure of the MIDI to Audio mode 2 process-2 in FIG. 10A.

FIG. 9 is a diagram visually showing the MIDI to Audio mode 2 process-2, and FIGS. 10A and 10B are flowcharts showing the procedure of the MIDI to Audio mode 2 process-2.

In FIG. 9 and FIGS. 10A and 10B, first, similarly to the MIDI to Audio-mode 2 process, among a plurality of item n data 21*a* included in a prepared playlist data, the MIDI song data in a location indicated by the MIDI song data storage path data 21*a*4 of the first item n data 21*a* having a checkmark assigned in the checkmark data 21*a*2 is read out from the external storage device 10 and written in the reproduction area of the RAM 7 to start reproduction, the first performance event included in that MIDI song data is then read out at the time of occurrence thereof, and when parameters in accordance with the thus read-out performance event are supplied to the tone generator circuit 13, digital recording starts (steps S31→S32→S33).

Next, when reproduction proceeds as far as a fade-out timing (steps S34→S35), that fade-out point t1 is stored in a digital audio recorder 23' (step S36), fade-out reproduction of the MIDI song data starts (step S37), and audio signals generated in the tone generator circuit 13 in response thereto are digitally recorded by the digital audio recorder 23'. In this case, although the fade-out timing is typically set at a predetermined fixed time (represented by number of seconds or number of measures) prior to the end of each MIDI song data, a configuration may be adopted whereby a suitable time for starting fade-out is automatically determined based on the MIDI song data being reproduced and the thus determined time is automatically set. A configuration may also be adopted whereby a user can select and set a preferred time.

When the digital recording of audio signals generated in response to the fade-out reproduction ends (when reproduction of the performance event at the end of the MIDI song data in question ends), digital recording by the digital audio recorder 23' is stopped, and the next digital recording starting position is set to the recorded fade-out point t1 from the current recording position t2 by the digital audio recorder 23', and recording that merges the digital audio data from position t1 to position t2 and the audio signals output from the tone generator circuit 13 starts (steps S38→S39).

Next, among a plurality of item n data 21*a* included in the playlist data, the MIDI song data at a location indicated by the MIDI song data storage path data 21*a*4 of the next item n data 21*a* having a checkmark assigned in the checkmark data 21*a*2 is read out from the external storage device 10 and written in the reproduction area of the RAM 7, fade-in reproduction is started, and the corresponding parameters are supplied to the tone generator circuit 13 (step S40).

In response thereto, the tone generator circuit 13 generates audio signals which gradually increase in volume from a soundless level and supplies them to the digital audio recorder 23', and at the same time, in correspondence with the first MIDI song data, the digital audio data from position t1 to position t2 (data during fade-out) among the digital audio song data that were generated by digital recording is reproduced in the digital audio recorder 23' to perform recording that merges this digital audio data and the audio signals (signals during fade-out) that were supplied from the tone generator circuit 13. When reproduction proceeds past position t2, reproduction of the digital audio data by the digital audio recorder 23' stops and the process thus returns to normal digital recording.

As long as an automatic performance apparatus is one in which a tone generator circuit has a number of sound producing channels of a degree that can provide adequate sound production for two MIDI song data to be reproduced simultaneously at a cross-fade portion, has a number of tracks that enable simultaneous reproduction of two MIDI song data, and has a structure that enables reproduction of two MIDI song data at different tempos, digital audio song data that underwent a similar cross-fade process can be obtained even without performing the above described type of recording to merge audio signals and digital audio data. However, this kind of tone generator circuit or automatic performance apparatus is expensive. In order to avoid this kind of problem, crossfading of neighboring digital audio song data is implemented using recording that merges audio signals and digital audio data.

The above process is performed up to the MIDI song data that corresponds to the final item n data 21*a* that is assigned with a checkmark. When digital recording for that final MIDI song data ends, the digital recording by the digital audio recorder 23' is terminated and the digital audio data from the digital audio data digitally recorded in correspondence to the first MIDI song data until the digital audio data digitally recorded in correspondence to the final MIDI song data are stored together in a single file format in the external storage device 10 (step S42).

Thus, according to the MIDI to Audio mode 2 process-2, it is possible to smooth a joint between two audio data that correspond to two neighboring automatic performance data. Further, it is possible to overlap one part of two audio data that correspond to two neighboring automatic performance data without increasing the number of tracks of automatic performance data or sound producing channels of the sound source.

Next, a MIDI to Audio mode 2 process-3 will be described as another modification example of the MIDI to Audio mode 2 process.

When connecting neighboring digital audio song data by cross-fading, the MIDI to Audio mode 2 process-2 generates the digital audio data for one of the digital audio song data by output from the tone generator circuit 13 and generates the digital audio data of the other digital audio song data by reproduction with the digital audio recorder 23', and then performs recording to merge both of the digital audio data. In contrast, as shown in FIG. 11 and FIGS. 12A and 12B, the difference between that process and the MIDI to Audio mode 2 process-3 is that, by reproducing all of the MIDI song data that are objects of digital recording, one at a time, and performing digital recording, the MIDI to Audio mode 2 process-3 creates individual temporary files for each digital audio song data (step S51), reproduces the temporary files of neighboring digital audio song data using two reproduction tracks of a digital audio recorder, and writes the result obtained by merge processing (not recording and merging) at a fade-out point in a recording track (step S53).

Figure 12A:
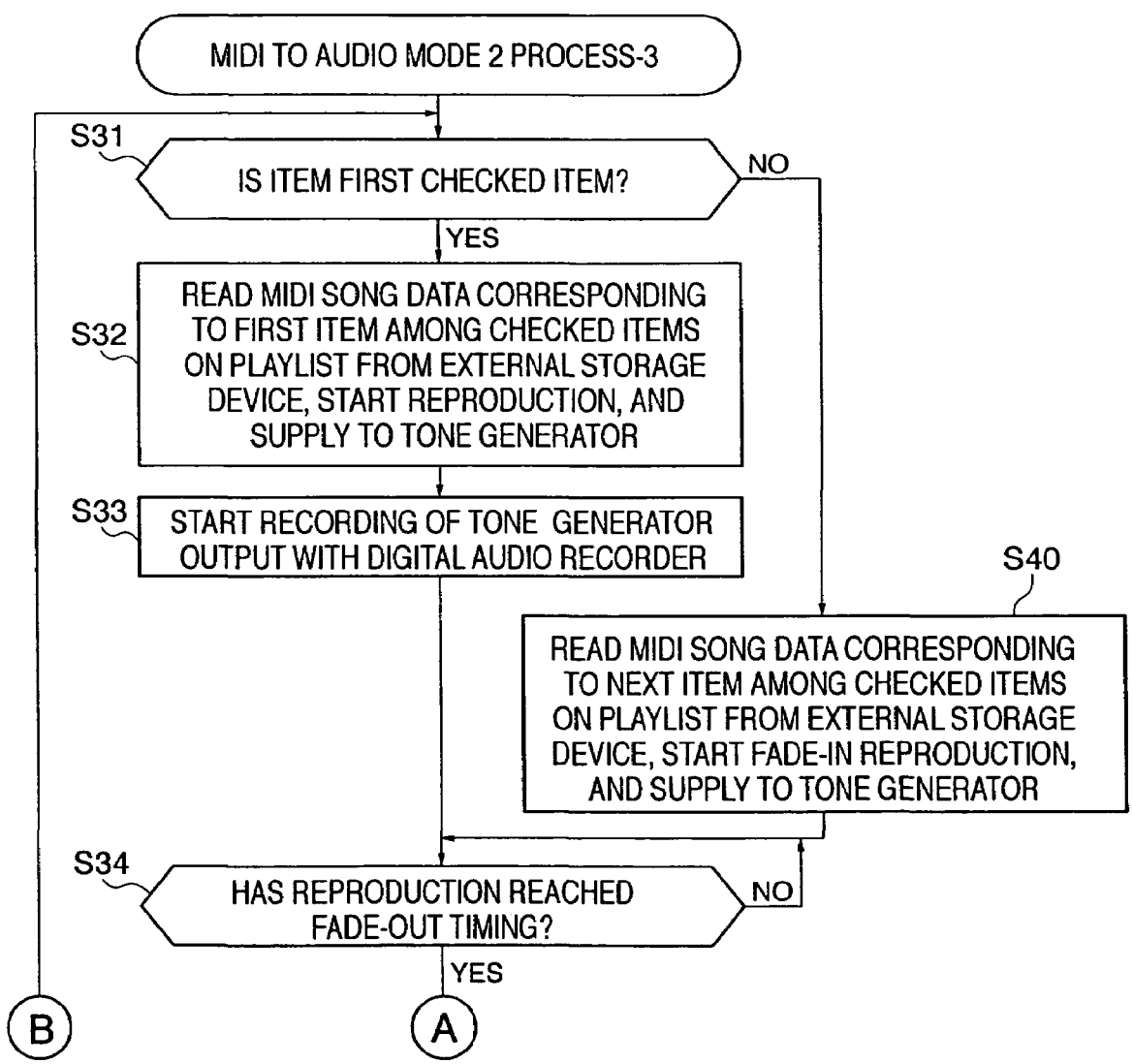
FIG. 12A is a flowchart showing the procedure of the MIDI to Audio mode 2 process-3.
Figure 12B:
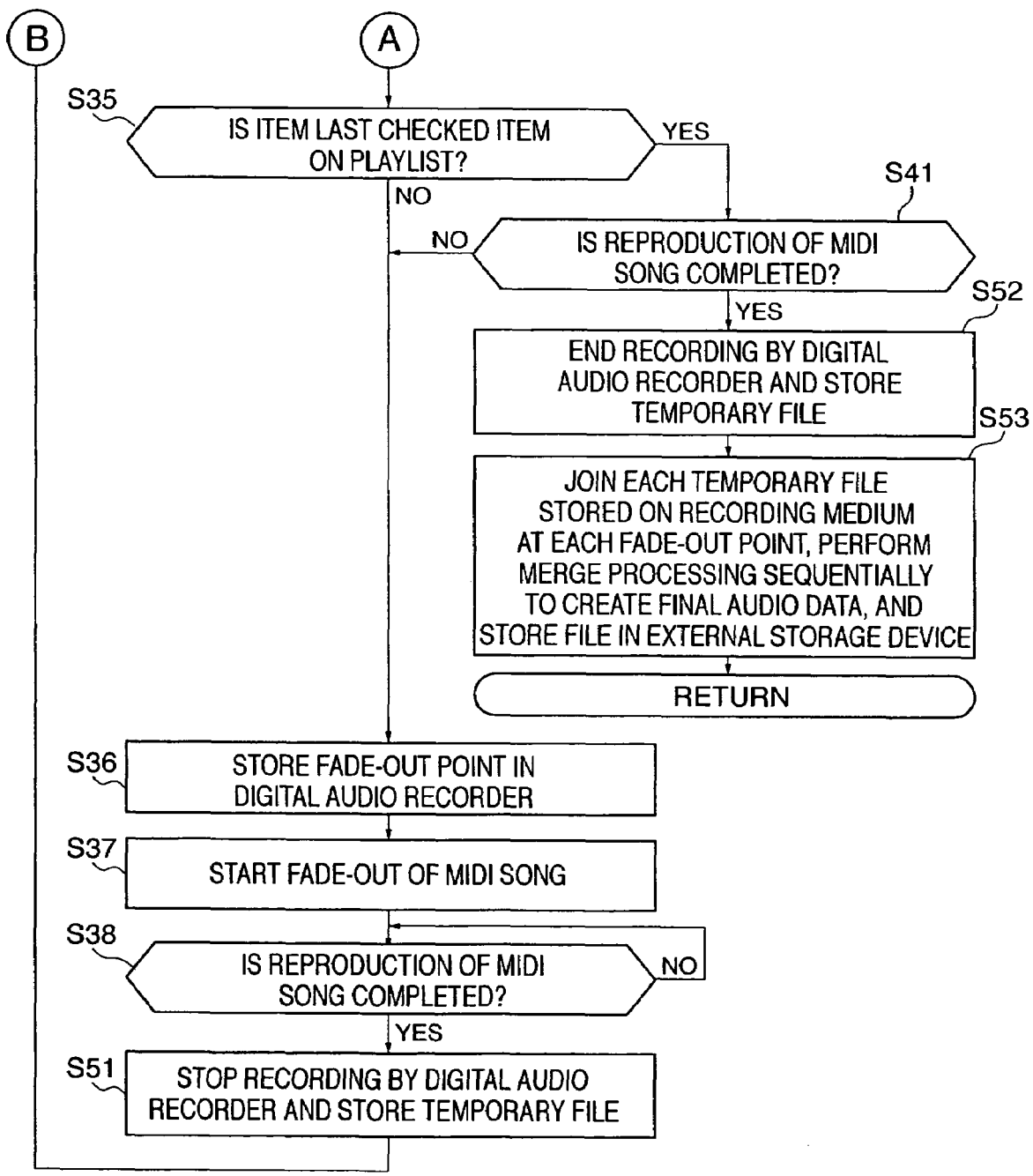
FIG. 12B is a flowchart showing a continued part of the procedure of the MIDI to Audio mode 2 process-3 in FIG. 12A.

As will be understood by comparing the flowcharts of FIGS. 12A and 12B and the flowcharts of FIGS. 10A and 10B, the MIDI to Audio mode 2 process-3 is configured by modifying one part of the MIDI to Audio mode 2 process-2. Since the contents of that modification will be understood from the flowcharts of FIGS. 12A and 12B, a description thereof is omitted here.

Thus, according to the MIDI to Audio mode 2 process-3, it is possible to smooth a joint between two audio data corresponding to two neighboring automatic performance data. Further, it is possible to overlap one part of two audio data that correspond to two neighboring automatic performance data without increasing the number of tracks of automatic performance data or sound producing channels of the sound source.

In the above described MIDI to Audio mode 2 process-2 and -3, the MIDI song data that is the object of the process is taken as (one part of) MIDI song data described in the playlist data 21. However, since the principal feature of the MIDI to Audio mode 2 process-2 and -3 is that two digital audio song data that were generated in correspondence to two neighboring MIDI song data are connected by cross-fading, there is no necessity for the MIDI song data as the basis of the digital audio song data to be decided only based on the playlist data 21. Accordingly, the MIDI to Audio mode 2 process-2 and -3 may take as an object for processing, for example, MIDI song data selected by a user independently of the playlist data 21.

Although in the present embodiment, MIDI song data as the object of a MIDI to Audio process is limited to only the MIDI song data that has a checkmark assigned in the checkmark data 21a2 among all the MIDI song data designated for reproduction by the playlist data 21, this invention is not limited thereto, and all the MIDI song data that is designated for reproduction by the playlist data 21 may be the object of the MIDI to Audio process.

Further, although in the present embodiment, MIDI song data (typically comprising a standard MIDI file) is employed as the automatic-performance data, this invention is not limited thereto, and any kind of data may be used as long as it is a type of data sequence that drives a tone generator, such as unique sequence data or automatic performance data of respective manufacturers, data for a melody signaling an incoming call, or karaoke data.

It is to be understood that the object of the present invention may also be accomplished by supplying a system or an apparatus with a storage medium in which a program code of software, which realizes the functions of the above described embodiment is stored, and causing a computer (or the CPU or MPU) of the system or apparatus to read out and execute the program code stored in the storage medium.

In this case, the program code itself read from the storage medium realizes the functions of the above described embodiment, and hence the program code and a storage medium in which the program code is stored constitute the present invention.

Examples of the storage medium for supplying the program code include a flexible disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded from a server computer via a communication network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing the CPU or the like provided in the expansion board or the expansion unit to perform a part or all of the actual operations based on instructions of the program code.

What is claimed is:

1. A performance data processing apparatus comprising:
   a storage device that stores a playlist data that designates a reproduction order of a plurality of files, each file comprising performance data that comprise a tone generator driving event sequence;
   a reproduction device that sequentially reproduces each of the plurality of files comprising performance data in an order designated by the playlist data stored in the storage device;
   a tone generator that is supplied with tone generator driving events that occur in response to reproduction of each file comprising performance data by the reproduction device, and that generates audio signals based on the supplied tone generator driving events;
   a recording device that digitally records audio signals generated by the tone generator;
   a retention device that retains audio signals digitally recorded by the recording device as digital audio data; and
   a control device that controls so as to generate a single file comprising digital audio data from the plurality of files comprising performance data by starting digital recording by the recording device in response to starting of reproduction of a first file comprising performance data by the reproduction device and stopping digital recording by the recording device in response to stopping of reproduction of a last file comprising performance data by the reproduction device, and to retain the generated single file comprising digital audio data through the retention device.

2. The performance data processing apparatus according to claim 1 further comprising:
   a cross-fade processing device that performs cross-fade processing for a joint between two audio data that correspond to two neighboring performance data among the plurality of files comprising performance data.

3. The performance data processing apparatus according to claim 2, wherein the cross-fade processing device reproduces a first performance data that is earlier in a reproduction order among the two neighboring performance data while fading-out the first performance data from a predetermined fade-out start position, and after digitally recording audio signals generated by the tone generator in response thereto to generate a first digital recording data, adopts the fade-out start position of the first digital recording data as a record starting position and reproduces a second performance data that is later in the reproduction order among the two neighboring performance data while fading-in the second performance data to merge audio signals generated by the tone generator in response thereto with the first digital recording data, and performs digital recording thereof.

4. The performance data processing apparatus according to claim 2, wherein the cross-fade processing device reproduces a first performance data that is earlier in a reproduction order among the two neighboring performance data while fading-out the first performance data from a predetermined fade-out start position, digitally records audio signals generated by the tone generator in response thereto to generate a first digital recording data, and also reproduces a second performance data that is later in the reproduction order among the two neighboring performance data while fading-in the second performance data until a predetermined fade-in end position, and after digitally recording audio signals generated by the tone generator in response thereto to generate a second digital recording data, merges a data portion from the fade-out start position to the fade-in end position among the first digital recording data and a data portion from the fade-out start position to the fade-in end position among the second digital recording data in a connected state.

5. A performance data processing method comprising:

a reproduction step of reproducing in sequence each of a plurality of files comprising performance data in an order designated by a playlist data stored in a storage device that stores a playlist data that designates a reproduction order of the plurality of files, each file comprising performance data that comprise a tone generator driving event sequence;

a recording step of digitally recording audio signals generated by a tone generator that is supplied with tone generator driving events that occur in response to reproduction of each file comprising performance data by the reproduction step and that generates audio signals based on the supplied tone generator driving events;

a storage step of storing audio signals digitally recorded by the recording step in a storage medium as digital audio data; and a control step of controlling so as to generate a single digital audio data from the plurality of files comprising performance data by starting digital recording by the recording step in response to starting of reproduction of a first file comprising performance data by the reproduction step and stopping digital recording by the recording device in response to stopping of reproduction of a last file comprising performance data by the reproduction step, and to retain the generated single file comprising digital audio data through the storage step.

6. A performance data processing method according to claim 5 further comprising:

a cross-fade processing step of performing a cross-fade process for a joint between two audio data that correspond to two neighboring performance data among the plurality of files comprising performance data.

7. A computer-readable medium containing a program for causing a computer to execute a performance data processing method, comprising:

reproduction module of reproducing in sequence each of a plurality of files comprising performance data in an order designated by a playlist data stored in a storage device that stores a playlist data that designates a reproduction order of the plurality of files, each file comprising performance data that comprise a tone generator driving event sequence;

a recording module of digitally recording audio signals generated by a tone generator that is supplied with tone generator driving events that occur in response to reproduction of each file comprising performance data by the reproduction module and that generates audio signals based on the supplied tone generator driving events;

a storage module of storing audio signals digitally recorded by the recording module in a storage medium as digital audio data; and a control module that controls so as to generate a single file comprising digital audio data from the plurality of files comprising performance data by starting digital recording by the recording module in response to starting of reproduction of a first file comprising performance data by the reproduction module and stopping digital recording by the recording module in response to stopping of reproduction of a last file comprising performance data by the reproduction module, and to retain the generated single file comprising digital audio data through the storage module.

8. The computer-readable medium according to claim 7, wherein the program further comprises:

a cross-fade processing module of performing cross-fade processing for a joint between two audio data that correspond to two neighboring performance data among the plurality of performance data.

* * * * *